Patented Dec. 17, 1935

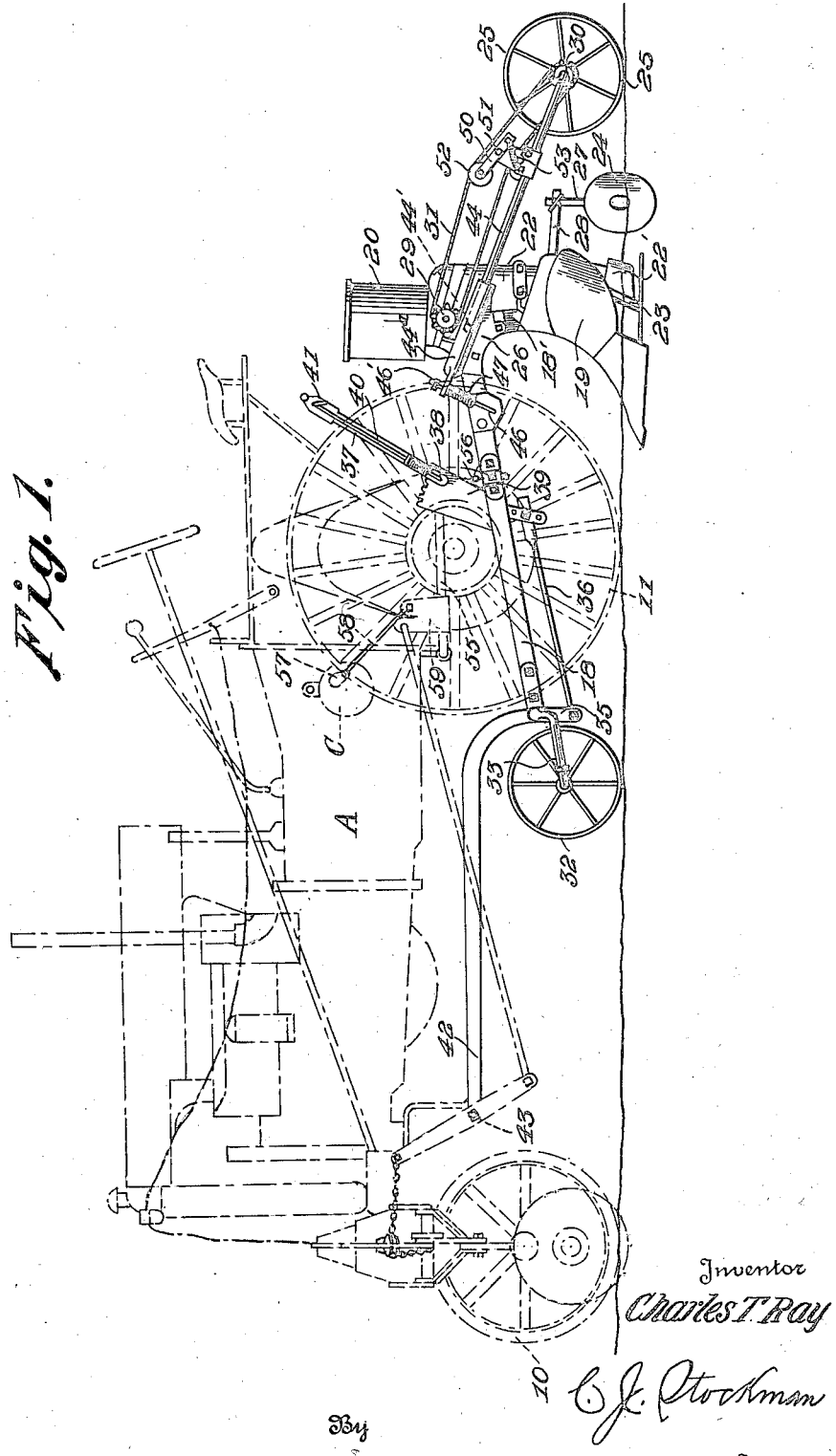

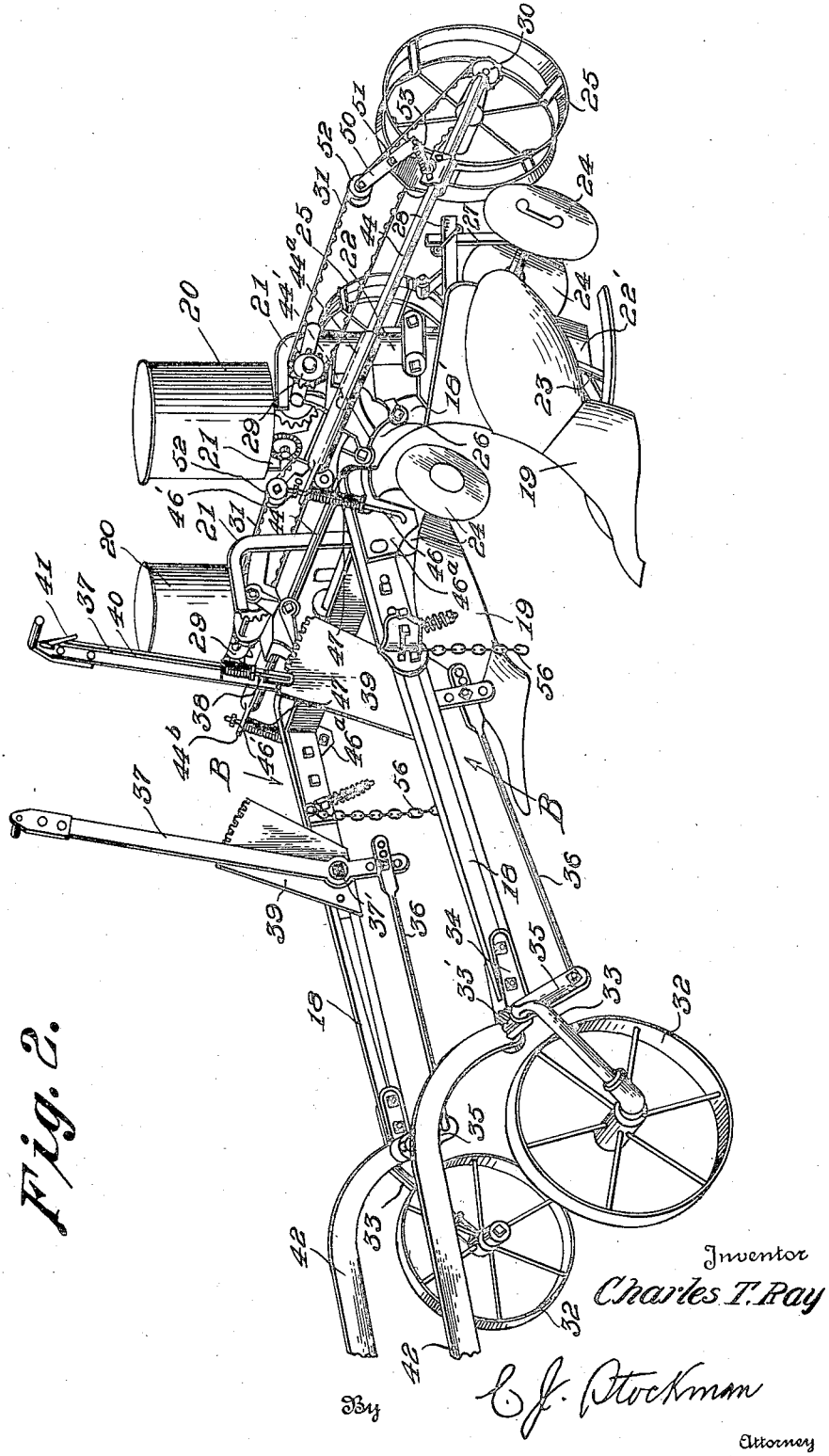

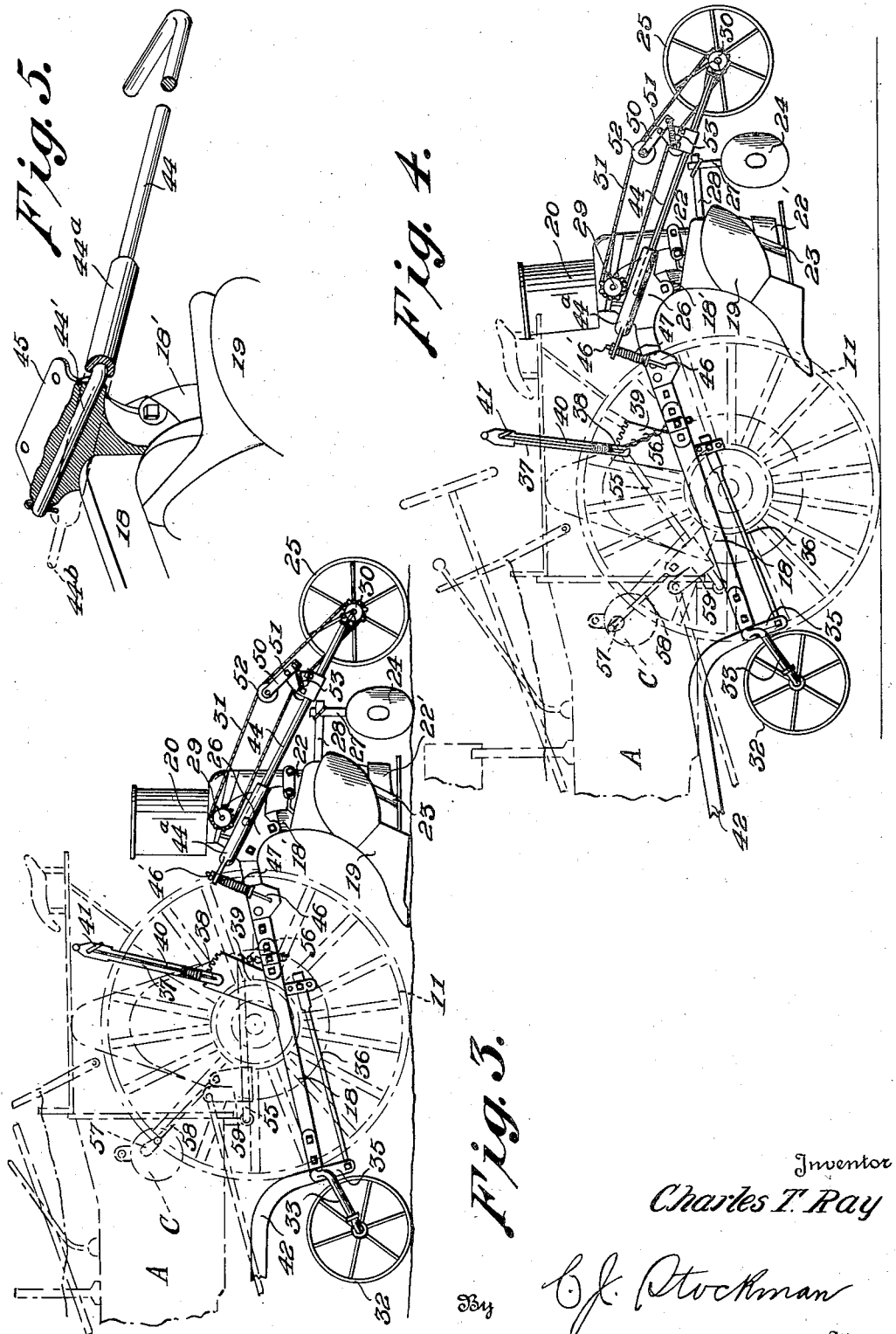

2,024,778

UNITED STATES PATENT OFFICE 2,024,778

SEED PLANTER

Charles T. Ray, Louisville, Ky., assignor to B. F. Avery & Sons Company, Louisville, Ky., a corporation of Delaware Original application July 15, 1932, Serial No. 622,760. Divided and this application March 15, 1933, Serial No. 660,899

19 Claims. (Cl. 111—62)

This application is a division of my application for Letters Patent of the United States, filed July 15, 1932, Serial No. 622,760. It particularly relates to the press wheel mechanism shown and described, and also claimed, in the parent application (Ser. No. 622,760) aforesaid as originally filed.

The primary object of the invention is to provide a seed planter with a press wheel which is raised and lowered from and into working position with the beam of the planter and while in operation is held under spring tension of a nature such as to insure sufficient traction of the wheel on the earth in the bottom of the furrow, under all conditions respecting the contour of the land, without at any time providing enough tractional force to create a tendency to lift the beam of the planter to which said wheel is connected.

This primary object, and others which will be obvious to those familiar with the invention, are accomplished in the embodiment of the invention illustrated in the accompanying drawings and set forth in the following description.

In the accompanying drawings I have illustrated a plurality of tractor-drawn seed planters arranged for row crop operation and having a particular correlation with the tractor analogous to that shown, described and claimed in Letters Patent of the United States, issued November 1, 1932, upon an application filed by me December 29, 1930, and numbered, serially 505,416: but I would have it understood, at the outset, that while the press wheel mechanism forming the subject of the instant invention is well adapted for use as a part of seed planters of the particular type shown in the aforesaid Letters Patent (No. 1,885,763) and in my aforesaid parent application (Ser. No. 622,760) it is not confined to planters of the said constructions and types, or to planters constructed to be attached to tractors, or to a plurality of planters relatively arranged for row crop operation. In short, the press wheel mechanism which forms the subject of this application for Letters Patent is intended to be employed as a part of or in operative relationship to, a seed planter of any appropriate construction.

In the accompanying drawings, wherein like characters of reference denote corresponding parts in the several views:—

Fig. 1 is a side elevation of a planter provided with my press wheel mechanism, the planter being shown in full lines and formed as an attachment to and being shown in operative relationship with, a tractor, which tractor is shown in dot-and-dash outline;

Fig. 2 is a perspective view of two planters, or planting attachments for tractors, arranged for row crop operation and provided with my improved press wheel mechanisms;

Fig. 3 is a side elevation, in dot-and-dash outline, of the rear end of a tractor and a side elevation, in full lines, of a planting attachment thereto, having my improved press wheel mechanism, and shows the planting attachment in the position it occupies preparatory to entering the soil;

Fig. 4 is a view similar to Fig. 3, but shows the planting attachment in transport position; and Fig. 5 is a detail representation, partly in section, of one of the arms for supporting the corresponding press wheel, and is particularly intended to show the pivotal connection of the upper end of said arm with the corresponding planter-beam.

A designates a tractor which may be of any suitable construction and 10 and 11 designate the front and rear supporting wheels thereof. B, B (Fig. 2) designate a pair of planting attachments designed to be connected to said tractor, near the front end of the latter. These planting attachments, in practice, are arranged between the wheels 11 and extend for a considerable distance underneath the frame of the tractor and are relatively disposed for row crop operation. They are connected with the tractor by appropriate means, such as those shown in my aforesaid patent, for example, by which they are raised from and lowered into working position by power derived from the tractor and which power is under control of the operator of the tractor. Since this means forms no part of the present invention it is unnecessary to describe or illustrate it in full detail herein.

The planting attachments in the illustrated embodiment of the invention are of identical construction and hence the following description of one will be understood to apply equally to the other.

18 designates an appropriate beam whose rear end is formed to provide a curved downward extension 18' to which a middle burster plow body 19 is suitably secured. 20 designates a seed hopper carried by arms 21 suitably attached to the beam. Seed dropping mechanism of any suitable nature, not necessary particularly to show or describe herein, is operatively associated with said hopper to control the discharge of seed therefrom into a seed chute 22 having an extension 22' for the discharge of the seed. An opener 23 is arranged rearward of the middle burster 19 and immediately in advance of said extension 22'.

Rearward of said chute extension are seed coverers 24 and rearward of said seed coverers is a press wheel 25. The illustrated press wheel is of the open type, but any suitable type of construction of press wheel may be employed. The hopper supporting arms 21 and the seed chute 22 and its extension 22' are carried by or from the beam 18 by any suitable means, the means shown including brackets 26 of appropriate construction, suitably secured to the beam 18 near the upper end of the downward extension 18' of said beam. The openers 23 may be of any suitable type. The seed coverers 24 are shown as supported by an arm 27 whose upper end is mounted upon a rearward projection 28 secured in any suitable way to the downward extension 18' of the beam. The seed dropping mechanism, which may be of any suitable nature, includes a gear 29 which derives motion from the corresponding press wheel 25 and transmits said motion to the parts of the seed dropping mechanism which control the flow of seeds from the hopper 20 into the chute 22. In the illustrated embodiment the gear 29 is connected with a gear 30 on the axle of the corresponding press wheels by chains 31.

A gage wheel 32 is arranged at the front end of the beam 18, upon a lateral extension from the lower end of a crank arm 33 whose upper end is bent to provide a lateral extension, which forms a pivot 33'. This pivot 33' is journalled in an appropriate bearing 34 suitably secured to the front end of the beam 18 and is provided with a crank arm 35 whose lower end is connected by a link 36 with the lower end of a depth regulating lever 37. This lever 37 is fulcrumed at 37' upon the beam 18 and is provided with a spring-pressed latch 38 which cooperates with a toothed segment 39 in holding the lever and gage wheel in their adjusted positions. Each latch is connected by a rod 40 with an appropriate operating element 41 arranged adjacent the grip portion of the handle.

It will be understood that when the lever 37 is moved about its fulcrum at 37' the crank arm 33 will be moved correspondingly, in clockwise or counterclockwise direction, according to the direction of movement given said lever 37, and will correspondingly raise or lower the beam 18, thereby regulating the depth at which the plow body 19, opener 23 and coverers 24 will operate.

Movement of each planting attachment in following the contour of the land is from the pivot 33' formed by the lateral extension at the upper end of the supporting arm 33 of the gage wheel as the axis of such movement.

As thus far described, each planter is of a construction and type for which no novelty is claimed and to any detail of which the invention is not restricted. It may also be here mentioned that in practice the planters are suitably connected with each other by a means which restrains them against relative sidewise movement and is preferably of a construction adapted to permit the two planting attachments to move relatively to each other in accord with the contour of the land traversed by the respective gage wheels. A means of the nature referred to is illustrated in my aforesaid Patent No. 1,885,763.

Each planting attachment is provided with a draft link 42 whose rear end is pivotally connected with the forward end of the beam and whose forward end is pivotally connected with the tractor near the forward end of the latter. It is preferred in practice to mount the rear end of the draft link 42 upon the lateral extension 33' of the gage wheel carrying arm 33 and to mount the front end of said draft link upon a pivot 43 secured to an appropriate part of the tractor by which it will be held against up and down movements relatively to the tractor.

Each press wheel 25 is mounted to have rotation about a horizontal axis at the lower end of a rearwardly inclined supporting arm 44 whose upper end portion, at a place somewhat rearward of the upper extremity of the arm, is substantially in an intersecting relationship with the rear end portion of the beam 18 at a place adjacent the upper end of the downward extension 18' of the latter and is connected to the beam by a horizontal pivot arranged at its point of intersection with the beam. Hence, said arm has movement about a horizontal axis disposed near its upper extremity. A connecting means of vibratory and elastic nature is operatively related to the upper portion of said arm, forward of the pivot, and serves to insure sufficient traction between the press wheel and the ground at all times without at any time producing, under any soil condition, a tractional effect which would create a tendency to lift the beam, as hereinafter more fully explained.

In the illustrated embodiment, as shown best in Fig. 5, the upper end of the arm 44 is bent laterally to form a pivot 44' which extends through one side of the tubular extension and is journalled in a bracket 45 suitably secured to the upper end of the downwardly curved extension 18' of the corresponding beam A. The tubular extension 44a forming part of the arm extends forward of said pivot and is flattened at its front end, as shown at 44b.

The vibratory and elastic connecting means hereinbefore referred to comprises an upwardly extending rod 46 whose lower end is horizontally pivoted in a bracket 46a and whose upper end extends loosely through an opening in the flattened portion 44b and is provided above said flattened portion with an adjustable stop 46' and below said flattened portion with a spring 47. The upper, forward, end of the arm extension 44a rests upon the upper end of the spring 47 and is movable upward and downward, in conformity with variations in the height of the earth over which the press wheel 25 rolls, within limits defined by the stop 46' and the compressibility of the spring 47. These up and down movements of the upper end of the arm 44 are in an arc struck from the pivot 44' and the rod 46, together with the spring 47 and stop 46', are responsive to such arcuate movement of the arm 44 and hence are responsive to the movements of the press wheel in passing over uneven surface, the said rod 46 moving about a horizontal axis at its connection with the beam 18, or bracket 46a attached to the beam. When the parts are in the position shown in Fig. 1 the spring 47 is under compression sufficient to insure rolling contact of the press wheel with the earth disposed over the deposited seed but insufficient to cause the exertion of pressure strong enough to tend to raise the beam. This condition is maintained under all variations in the height of the earth engaged by the press wheel since the rod 46 and spring 47 are responsive to upward and downward movements of the press wheel, caused by unevenness in the earth engaged by said wheel. It will be noticed that the upper surface of the flattened end of the arm-extension 44a is spaced from the stop 46' to thereby permit relative movement between said flattened end and said stop.

In the operation of the implement, the rod 46 and its spring 47 respond instantly to vibratory movements of the flattened end of the arm extension 44a, caused by unevenness of the earth contacted by the press wheel and it has been observed that vibratory movements communicated to said rod have been substantially continuous. The stop 46' is adjustable along the length of the rod 46 to thereby vary the distance between it and the flattened end of the press wheel supporting arm and thereby correspondingly vary the extent of the relative movement of said flattened end and rod.

Reverting to the chains 31 which transmit movement from the press wheels 25 to the respective seed dropping mechanisms, it will be noticed that tighteners automatically operable to impose yieldable pressure on said chains are provided. Each tightener includes an arm 50 which is fulcrumed between its ends, at 51, and is provided at one end with a chain engaging member 52 and at its other end with a tensioning spring 53.

Reference has hereinbefore been made to the fact that the particular planting attachments herein illustrated are raised and lowered by power derived from the tractor and although this is not essential in respect of the press wheel mechanism which constitutes the present invention, it nevertheless may not be out of place to state that the mechanism referred to includes a clutch having a driving member and a driven member which clutch, under control of the operator, raises the attachments from working position and lowers them to working position by successive half-revolutions of the driven member of the clutch. This mechanism as viewed from one side of the tractor is indicated at C in Figs. 1, 3 and 4 and applies lifting power to the planting attachments through the medium of a bail whose arms 55, are suitably connected to the driven member of the clutch and also to the beams 18 of the respective planting attachments. The illustrated connections to the beams 18 are links 56 whose upper ends are suitably attached to the free ends of the bail arms 55 and whose lower ends are suitably attached to the beams 18; and the connections between the bail arm and the driven member of the clutch, at the side of the implement seen in Figs. 1, 3 and 4, includes a crank 57, a link or pitman 58 and an ear 59, said link or pitman being pivoted at its opposite ends to said crank and ear, respectively, and said ear being suitably secured to the bail arm.

When the planting attachments are in working position, shown in Fig. 1, and it is desired to raise them to transport position, shown in Fig. 4, the driving member of the clutch is locked to the driven member of the clutch and the latter is thereby caused to move in a direction which will swing the bail arms counterclockwise, thereby raising the planting attachments completely off the ground; and when the planting attachments are in their raised position and it is desired to lower them to working position, the driven member of the clutch is again locked in operative relationship with the driving member and is caused to move in a direction which forces the bail arms in a downward direction, whereupon the planting attachments, which are suspended from the free ends of the bail arms, will descend into their working position. It is well known that clutches of this type are so constructed that the driven members are released from the driving members automatically upon the completion of one-half of a complete revolution of the former, and it will be noticed that the movements of the planting attachments from transport position to working position or from working position to transport positions are about the pins 43 as the axis of such movement. The movements of the planting attachments in up and down directions in following the contour of the land traversed by the gage wheels 32, however, are about the pivots 33' formed by a lateral projection in the upper end of the arm 33, and it will be noticed in this connection that the chains 56 permit such movements of the planting attachments without imparting corresponding movement to the bail arms. It will also be noticed that the connection between the arms which carry the press wheels and the beams 18 are such that said arms and press wheels are raised and lowered bodily in the raising and lowering movements of the beams 18 from and into working position. Each press wheel in the operation of the planter, or planting attachments, to which it is connected exerts sufficient pressure upon the dirt which has been thrown over the deposited seed in the furrow by the coverers to press said dirt upon the seed, but in practice its movement is of a vibratory nature and at no time is it pressed upon the dirt with sufficient force to exert any pronounced tendency to lift the planter beam.

Having thus described the invention what I believe to be new and desire to secure by Letters Patent, is:

1. A tillage implement including a ground-engaging wheel, a supporting member for said wheel, said member being pivoted between its ends and the wheel being journalled to said member at one side of the pivot, and a pivoted rod provided with a spring and with a stop between which the end of said member at the side of the pivot opposite the wheel extends, said spring yieldably holding the wheel in contact with the earth and said stop being normally spaced from said member to permit movement relatively thereto of the corresponding end of the member in response to unevenness in the contour of the earth over which the wheel rotates.

2. A planter including a beam, a press wheel supporting member having pivotal connection between its ends with said beam, a press wheel journalled upon said press wheel supporting member rearward of said pivot, a rod having pivotal connection with the beam and extending through the end of the press wheel supporting member forward of the pivot of the latter, and a spring and a stop, both carried by said rod, said spring being operatively related to the end of the press wheel supporting arm to hold the wheel yieldably in contact with the earth and said stop being normally spaced from said member to permit movement relatively thereto of the corresponding end of said member in response to variations in the earth over which the wheel rotates.

3. In a tillage implement, a furrow opener, means for supporting the furrow opener, a ground-engaging press wheel rearward of the opener, a member which carries said wheel and has pivotal connection near its forward end with the means which supports the furrow opener, vibratory means connecting the forward end of said member with the means which supports the furrow opener and includes a spring engaged with one side of said member and a stop normally spaced from the opposite side of the member and toward and away from which the member has oscillatory movement.

4. In a tillage implement, a furrow opener, means for supporting the furrow opener, a ground-engaging wheel arranged rearward of the furrow opener, a supporting member which carries said ground-engaging wheel and has pivotal connection with the means which supports the furrow opener, said member extending forward of its pivot and having an opening in its forward end, and a pressure means for said member, including an element whose lower end has pivotal connection with the supporting means of the furrow opener and is provided above the latter with a stop, and a spring which is mounted upon said element and tends to press the forward end of the press wheel supporting member toward said stop.

5. A planter comprising a beam, a furrow opener supported by the beam, seeding means also supported by the beam and having a seed outlet at a place immediately rearward of the furrow opener, a press wheel arranged rearward of the seed discharge outlet, a supporting member for said press wheel, said member having pivotal connection between its ends with the beam and a pressure means operatively related to the supporting member forward of the pivot of the latter, said pressure means including a pivoted element which extends loosely through the forward end of said supporting member and is provided above the latter with a stop and below the same with a spring tending to press the forward end of the supporting member toward the stop.

6. In a planter, means for consolidating earth about deposited seeds, comprising a pivoted press wheel supporting member, a press wheel connected to said member rearward of the pivot of the latter, said member extending forwardly from its said pivot, and means for holding the press wheel yieldably in rolling contact with the earth, including a spring and a pivoted member which carries said spring, said spring and its carrying member being operatively related to the forwardly extending portion of the press wheel supporting member and responsive to unevenness in the contour of the earth over which the wheel rotates.

7. A planter comprising means to prepare a bed for the reception of the seed, means for depositing the seed in said bed, means for covering the deposited seed, a press wheel for consolidating the earth about the seed, a pivoted supporting member to which the press wheel is connected at a place rearward of the pivot of said member, said member extending forwardly from its said pivot and being pivotally responsive to unevenness in the earth over which the wheel rotates, and means operatively related to the forwardly extending portion of said member and including a spring to hold the press wheel yieldably in rolling contact with the earth and a stop with respect to which the corresponding end of the press wheel supporting member is movable relatively in the pivotal movements of said member.

8. A planter including a frame member, a seed hopper, a seed chute, an opener forward of the discharge end of the seed chute, seed covering means rearward of said discharge end of the seed chute, a press wheel, a downwardly and rearwardly inclined press wheel supporting member which intersects the rear end portion of said frame member at a place near the forward end of said supporting member and is pivotally connected to said frame member at said place of intersection, and a vibratory supporting means carried by said frame member and with which the press wheel supporting member has a yieldable connection forward of the pivot of the latter.

9. A seed planter comprising means to prepare a bed for the reception of the seed, a hopper, a seed chute, seed dropping means in operative relationship with the hopper and chute, a seed covering means rearward of the discharge end of the chute, a press wheel rearward of the seed covering means, a driving connection between the press wheel and seed dropping means, a pivoted supporting member for the press wheel, and a vibratory and yieldable supporting connection operatively related to said supporting member in advance of the pivot of the latter.

10. A seed planter comprising means to prepare a bed for the reception of the seed, means for depositing the seed in said bed, means for covering the deposited seed, a press wheel for consolidating the earth about the seed, a main supporting member, a supporting member for said wheel, extending forwardly from the latter and pivoted between its ends to said main supporting member, and means for holding the press wheel in operative position, the latter means being responsive, through said press wheel and press wheel supporting member, to the contour of the earth engaged by the press wheel and including a spring which engages the end of the press wheel supporting member opposite the press wheel and a rod which carries said spring and is pivotally connected to the main supporting member.

11. A seed planter comprising a main supporting member; means to prepare a bed for the reception of the seed, a hopper, a seed chute, seed dropping means in operative relationship with the hopper and chute and a seed covering means rearward of the discharge end of the chute, all carried by said main supporting member; a press wheel rearward of the seed covering means; a driving connection between the press wheel and the seed dropping means; a supporting member for the press wheel, extending forwardly from the latter and pivoted between its ends to said main supporting member; a spring exerting pressure upon the press wheel supporting member forward of the pivot of the latter; and a member extending through said spring and having one of its ends pivoted to the main supporting member and its other end extending loosely through the forward end of the press wheel supporting member and provided above the latter with a stop.

12. In combination, a tractor, a planting attachment having a gage wheel, adjusting means carried by the planter and operatively related to the gage wheel to adjust the latter and thereby correspondingly change the depth at which the planter is intended to operate, a press wheel at the rear end of the planting attachment, a pivoted supporting arm for said press wheel, yieldable means carried by said attachment and operative upon said supporting arm at a place in advance of the pivot thereof for rendering the press wheel responsive to the contour of the earth engaged by it independently of any adjustment of the gage wheel and means, including a power lift mechanism, operative to raise and lower the planting attachment and its press wheel from and into working position by power derived from the tractor.

13. In combination, a tractor, a planting attachment flexibly connected to the tractor and including a main supporting member provided with means to prepare a bed to receive the seed and with seed dropping means and with a seed chute operatively related to the seed dropping means and with means to cover the seed, and also including an adjustable gage wheel and means to adjust said gage wheel, to thereby regulate the depth at which the attachment shall work, and said tractor having means, including a clutch upon successive partial revolutions for raising and lowering the planting attachment from and into working position, respectively, by power derived from the tractor, and said planting attachment also having an arm extending rearwardly from and pivotally connected between its ends to, the main supporting member, a press wheel at the rear end of said arm, a flexible driving connection between said press wheel and the seed dropping means, and means for exerting yielding pressure upon the forward end of said arm.

14. A seed planter comprising seed dropping means, a press wheel, a flexible driving connection operated by the press wheel and controlling the operation of the seed dropping means, an inclined supporting arm at the lower end of which the press wheel is mounted, said supporting arm being pivoted to have movement about a horizontal axis arranged near its upper end, a spring engaged with the upper end of the press wheel supporting-arm forward of the pivotal point of the latter and vibratorily mounted means which carries said spring and is operatively related to said upper end of the press wheel supporting-arm to co-act with said spring and arm in holding the press wheel in rolling contact with the earth without exerting sufficient pressure to tend to raise the attachment.

15. In combination, a tractor and a plurality of planting attachments having independently adjustable gage wheels and means for connecting said attachments to the tractor to enable them to be independently responsive to the contour of the soil engaged by the respective gage wheels, said planting attachments having press wheels and separate pivoted spring-pressed supports for said press wheels, mounted at the rear ends of the respective attachments and responsive to the unevenness of the earth engaged by the press wheels, independently of each other and of the gage wheels.

16. A tillage implement according to claim 18 in which the press wheel supporting-arm comprises a member whose upper end is bent laterally to form the pivot and a second member which is secured to the upper end of the first mentioned member and has an opening through which said pivot extends, the second member extending upwardly beyond the first mentioned member and having its free end flattened and formed with an opening to receive a member of the vibratory means.

17. A tillage implement comprising a main supporting member, a ground-engaging press wheel, a press wheel supporting-arm extending rearwardly in a downwardly inclined direction from the main supporting member, said arm comprising a member at the lower end of which the press wheel is mounted and whose upper end is bent laterally to provide a horizontal pivot with the main supporting member and a second member, of tubular form which is secured to the upper end of the first mentioned member and has an opening through which said pivot extends, the second member extending upwardly beyond the pivot, and being flattened and having an opening at its upper end, a vibratory rod extending loosely through said opening in the flattened portion of the second member of the press wheel supporting-arm, a spring mounted on said vibratory rod and engaging the undersurface of said flattened portion and a stop also mounted on said vibratory rod above said flattened portion.

18. A tillage implement comprising a main supporting member, a ground-engaging press wheel, a press wheel supporting-arm extending rearwardly in a downwardly inclined direction from the main supporting member and having pivotal connection near its forward end with the latter, yieldable means mounted to have vibratory movement about a horizontal axis in response to corresponding movements of the press wheel due to unevenness of the earth contacted by said wheel, said means having connection with the press wheel supporting-arm at a place in advance of the pivot connecting the latter with the main supporting member and a stop connected to said means and normally spaced from the corresponding end of the press wheel supporting-arm to permit the latter to move relatively thereto, for the purpose set forth.

19. A tillage implement comprising a main supporting member, a ground-engaging press wheel, a press wheel supporting-arm extending rearwardly in a downwardly inclined direction from the main supporting member and having pivotal connection near its forward end with the latter, said arm extending forwardly beyond its said pivotal connection and having an opening in its forward end, a rod extending upward from the main supporting member and connected to the latter to have movement about a horizontal axis, said rod having its upper end extending loosely through the opening in the press wheel supporting-arm and being provided with a spring having a stop respectively arranged below and above said arm, said stop being spaced from the upper surface of the arm.

CHAS. T. RAY.